United States Patent
Wang et al.

(10) Patent No.: US 11,878,268 B2
(45) Date of Patent: Jan. 23, 2024

(54) CARBON DIOXIDE FIXATION METHOD

(71) Applicants: TAIHEIYO CEMENT CORPORATION, Tokyo (JP); THE UNIVERSITY OF TOKYO, Tokyo (JP)

(72) Inventors: Dianchao Wang, Tokyo (JP); Takafumi Noguchi, Tokyo (JP); Takahito Nozaki, Sakura (JP); Yasuhide Higo, Sakura (JP)

(73) Assignees: TAIHEIYO CEMENT CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 136 days.

(21) Appl. No.: 17/429,978

(22) PCT Filed: Dec. 2, 2019

(86) PCT No.: PCT/JP2019/047028
§ 371 (c)(1),
(2) Date: Aug. 11, 2021

(87) PCT Pub. No.: WO2020/166176
PCT Pub. Date: Aug. 20, 2020

(65) Prior Publication Data
US 2022/0134280 A1   May 5, 2022

(30) Foreign Application Priority Data
Feb. 14, 2019   (JP) ................. 2019-024710

(51) Int. Cl.
*B01D 53/62*   (2006.01)
*B01D 53/81*   (2006.01)

(52) U.S. Cl.
CPC ............. *B01D 53/62* (2013.01); *B01D 53/81* (2013.01); *B01D 2251/404* (2013.01); *B01D 2257/504* (2013.01); *B01D 2258/0233* (2013.01); *B01D 2258/0283* (2013.01)

(58) Field of Classification Search
CPC .. B01D 53/62; B01D 53/81; B01D 2257/504; B01D 2258/0233; B01D 2258/0283; B01D 2251/404
USPC ........................................................ 423/230
See application file for complete search history.

(56) References Cited

U.S. PATENT DOCUMENTS

2005/0036932 A1* 2/2005 Takahashi ............... C01F 11/18
423/432

FOREIGN PATENT DOCUMENTS

| JP | H5-212278 A | 8/1993 |
| JP | H05-238790 A | 9/1993 |
| JP | H11-319765 A | 11/1999 |
| JP | 2000-197810 A | 7/2000 |
| JP | 2001-252525 A | 9/2001 |
| JP | 2005-97076 A | 4/2005 |
| JP | 2008-75391 A | 4/2008 |
| JP | 2009-28581 A | 2/2009 |
| JP | 2009-90198 A | 4/2009 |
| JP | 2020-15659 A | 1/2020 |

OTHER PUBLICATIONS

International Search Report of the International Searching Authority dated Feb. 10, 2020 for the corresponding International application No. PCT/JP2019/047028 (and English translation).
Written Opinion of the International Searching Authority dated Feb. 10, 2020 for the corresponding international application No. PCT/JP2019/047028 ( and English translation).
Extended European Search Report dated Oct. 28, 2022 issued in corresponding European Patent Application No. 19914871.9.

* cited by examiner

*Primary Examiner* — Anita Nassiri-Motlagh
(74) *Attorney, Agent, or Firm* — POSZ LAW GROUP, PLC

(57) ABSTRACT

Provided is a method of fixing a sufficient amount of carbon dioxide contained in a carbon dioxide-containing gas (e.g., a plant exhaust gas) simply, at low cost, and efficiently. The method of fixing carbon dioxide includes a contact step of bringing a carbon dioxide-containing gas into contact with powdery or grainy particles, which are each formed of a cementitious hardened body and each have a particle size of 40 mm or less, at a temperature of from 75° C. to 110° C. to fix carbon dioxide contained in the carbon dioxide-containing gas to the powdery or grainy particles, wherein the relative humidity of the carbon dioxide-containing gas is adjusted in accordance with the particle size of the powdery or grainy particles and the state of adjustment of moisture content of the powdery or grainy particles before the contact step.

3 Claims, No Drawings

CARBON DIOXIDE FIXATION METHOD

CROSS REFERENCE TO RELATED APPLICATIONS

This application is a U.S. National Stage Application of International Application No. PCT/JP2019/047028, filed on Dec. 2, 2019, that claims priority from Japanese Patent Application number 2019-024710 filed on Feb. 14, 2019, the contents of which are incorporated herein by reference.

TECHNICAL FIELD

The present invention relates to a method of fixing carbon dioxide in a carbon dioxide-containing gas (e.g., a plant exhaust gas).

BACKGROUND ART

There have been known various technologies for reducing carbon dioxide emissions into the atmosphere through the fixation of carbon dioxide in an exhaust gas.

For example, Patent Literature 1 describes a method of reducing carbon dioxide gas emissions, the method being characterized by including a step of bringing an exhaust gas containing $CO_2$ into contact with a bulk material of solid particles each containing CaO and/or $Ca(OH)_2$ as its component to fix the $CO_2$ in the exhaust gas as $CaCO_3$ to the solid particles, thereby reducing a $CO_2$ concentration in the exhaust gas. According to the method, the $CO_2$ in the exhaust gas produced in an industrial process or the like is efficiently absorbed and removed, and hence $CO_2$ emissions into the atmosphere can be reduced.

Patent Literature 2 describes a method of fixing carbon dioxide, the method being characterized by including the steps of: accumulating materials obtained by crushing waste concrete; supplying moisture to the accumulated material, followed by stirring to bring the material into a wet state; supplying an exhaust gas involving exhaust heat to the material in a wet state to dry the material; and repeating the above-mentioned steps of the moisture supply and the material stirring, and the exhaust gas supply again to fix carbon dioxide in the exhaust gas into the material. According to the method, the fixation of the carbon dioxide in the exhaust gas involving the exhaust heat can be achieved early with the recycled sand of the waste concrete.

Patent Literature 3 describes a carbon dioxide-fixing concrete structure that is obtained by forming a hardened body of a concrete composition, which contains water, cement, admixtures and aggregates, on a surface of a concrete structure. The carbon dioxide-fixing concrete structure has a carbon dioxide-fixing molded body that has a surface layer part having voids and that can fix carbon dioxide in the atmosphere by the surface layer part. According to the carbon dioxide-fixing concrete structure, the carbon dioxide in the atmosphere can be effectively fixed.

CITATION LIST

Patent Literature

[Patent Literature 1] JP 2000-197810 A
[Patent Literature 2] JP 2009-90198 A
[Patent Literature 3] JP 2008-75391 A

SUMMARY OF INVENTION

Technical Problem

An object of the present invention is to provide a method by which a sufficient amount of carbon dioxide in a carbon dioxide-containing gas (e.g., a plant exhaust gas) can be fixed easily, at low cost, and efficiently.

Solution to Problem

The inventors of the present invention have made extensive investigations with a view to solving the above-mentioned problem, and as a result, have found that in a carbon dioxide fixation method including a contact step of bringing a carbon dioxide-containing gas into contact with powdery or grainy particles, which are each formed of a cementitious hardened body and each have a particle size of 40 mm or less, at a temperature of from 75° C. to 110° C. to fix carbon dioxide contained in the carbon dioxide-containing gas to the powdery or grainy particles, when the relative humidity of the carbon dioxide-containing gas is adjusted in accordance with the particle size of the powdery or grainy particles and the state of adjustment of moisture content of the powdery or grainy particles before the contact step, a sufficient amount of the carbon dioxide in the carbon dioxide-containing gas can be efficiently fixed to the cementitious hardened body. Thus, the inventors have completed the present invention.

The present invention provides the following items [1] to [7].

[1] A method of fixing carbon dioxide, including a contact step of bringing a carbon dioxide-containing gas into contact with powdery or grainy particles, which are each formed of a cementitious hardened body and each have a particle size of 40 mm or less, at a temperature of from 75° C. to 110° C. to fix carbon dioxide contained in the carbon dioxide-containing gas to the powdery or grainy particles, wherein a relative humidity of the carbon dioxide-containing gas is adjusted in accordance with a particle size of the powdery or grainy particles and a state of adjustment of moisture content of the powdery or grainy particles before the contact step.

[2] The method of fixing carbon dioxide according to the above-mentioned item [1], further including, before the contact step, a classification step (i.e. a sorting step) of classifying (i.e. sorting) the powdery or grainy particles based on a sieving reference value (i.e. a standard value of sieve opening) set in a range of from 0.8 mm to 1.5 mm to provide powdery or grainy particles each having a particle size of less than the reference value and powdery or grainy particles each having a particle size equal to or more than the reference value.

[3] The method of fixing carbon dioxide according to the above-mentioned item [2], wherein an adjustment of the relative humidity of the carbon dioxide-containing gas is performed in accordance with the following (a) to (c):

(a) when the particle size of each of the powdery or grainy particles is less than the reference value, the relative humidity of the carbon dioxide-containing gas is adjusted to 20% or more irrespective of the moisture content of the powdery or grainy particles before the contact step;

(b) when the particle size of each of the powdery or grainy particles is equal to or more than the reference value, and the powdery or grainy particles before the contact step contain moisture (i.e. water), the relative humidity of the carbon dioxide-containing gas is adjusted to from 0% to 40%; and (c) when the particle size of each of the powdery or grainy particles is equal to or more than the reference value, and the powdery or grainy particles before the contact step are free of moisture (i.e. do not contain water), the relative humidity of the carbon dioxide-containing gas is adjusted to 20% or more.

[4] The method of fixing carbon dioxide according to the above-mentioned item [3], further including, in a case of the (b), a water absorption step of causing the powdery or grainy particles to absorb water by supplying the water to the powdery or grainy particles before the contact step, and further including, in a case of the (c), a drying step of drying the powdery or grainy particles until the powdery or grainy particles are brought into an absolute dry state before the contact step.

[5] The method of fixing carbon dioxide according to any one of the above-mentioned items [1] to [4], wherein the carbon dioxide-containing gas contains a carbon dioxide gas at a ratio of 5% or more as a volume fraction value.

[6] The method of fixing carbon dioxide according to any one of the above-mentioned items [1] to [5], wherein the carbon dioxide-containing gas is a plant exhaust gas.

[7] The method of fixing carbon dioxide according to any one of the above-mentioned items [1] to [6], wherein the cementitious hardened body is a recycled aggregate, a waste material of a building material formed of concrete or mortar, a waste material of a cement paste hardened body, or sludge produced in using ready-mixed concrete.

Advantageous Effects of Invention

According to the method of the present invention, a sufficient amount of the carbon dioxide in the carbon dioxide-containing gas (e.g., the plant exhaust gas) can be fixed simply, at low cost, and efficiently.

In addition, the fixation of the carbon dioxide can significantly reduce carbon dioxide emissions into the atmosphere.

DESCRIPTION OF EMBODIMENTS

A method of fixing carbon dioxide of the present invention is a carbon dioxide fixation method including a contact step of bringing a carbon dioxide-containing gas into contact with powdery or grainy particles, which are each formed of a cementitious hardened body and each have a particle size of 40 mm or less, at a temperature of from 75° C. to 110° C. to fix carbon dioxide contained in the carbon dioxide-containing gas to the powdery or grainy particles, in which the relative humidity of the carbon dioxide-containing gas is adjusted in accordance with the magnitude of the particle size of each of the powdery or grainy particles and the situation of the adjustment of the moisture content of the powdery or grainy particles before the contact step.

In the present invention, the object of contact with the carbon dioxide-containing gas is powdery or grainy particles (i.e. solids each having a size of powder or more larger matter), which are each formed of a cementitious hardened body and each have a particle size of 40 mm or less.

Herein, the cementitious hardened body means a product obtained by the hardening of a composition containing cement and water, and means, for example, a hardened body formed of concrete, a hardened body formed of mortar, or a hardened body formed of a cement paste.

In addition, the term "cementitious hardened body" as used herein encompasses a hardened body that is semi-hardened (in other words, a hardened body whose hardening is in progress) as well as a hardened body that is completely hardened.

A recycled cementitious hardened body is preferably used as the cementitious hardened body used in the present invention from the viewpoint of accelerating the utilization of wastes.

Examples of the recycled cementitious hardened body include a recycled aggregate, a waste material of a building material formed of concrete or mortar, a waste material of a cement paste hardened body, and sludge produced in production of ready-mixed concrete (i.e. sludge that is completely hardened or sludge that is in a semi-hardened state after dehydration treatment).

The powdery or grainy particles each formed of the cementitious hardened body each have a particle size of 40 mm or less (preferably 30 mm or less, more preferably 20 mm or less) for enlarging the area of their contact with the carbon dioxide-containing gas to increase the amount of the carbon dioxide to be fixed. Herein, the particle size refers to a maximum size in each of the powdery or grainy particles (e.g., when a section of the powdery granule is an elliptical shape, the size of its major axis).

In the present invention, grains (i.e. particles each having a size larger than powder) each having a particle size of more than 40 mm may be included as the object of contact with the carbon dioxide-containing gas together with the powdery or grainy particles each having a particle size of 40 mm or less. In this case, the amount of the particles each having a particle size of more than 40 mm in the total amount (expressed as 100 parts by mass) of all of the particles, which include particles each have a particle size of more than 40 mm and particles each having a particle size of 40 mm or less, is preferably 50 parts by mass or less, more preferably 30 parts by mass or less, particularly preferably 10 parts by mass or less.

Herein, the carbon dioxide-containing gas means a gas containing a carbon dioxide gas (i.e. $CO_2$ that is a gas).

An example of the carbon dioxide-containing gas is a plant exhaust gas (i.e. a gas emitted from a factory).

Examples of the plant exhaust gas include an exhaust gas of a cement plant and an exhaust gas of a coal-fired power plant.

A highly purified gas obtained by separation and recovery from a plant exhaust gas may be used as the plant exhaust gas in addition to the above-mentioned examples.

The ratio of the carbon dioxide gas in the carbon dioxide-containing gas is preferably 5% or more, more preferably 10% or more, still more preferably 15% or more, particularly preferably 20% or more as a volume fraction value. The reason of the ratio being preferably 5% or more is that the amount of the carbon dioxide to be fixed increases, and hence a reducing effect on carbon dioxide emissions into the atmosphere becomes larger.

In the present invention, the carbon dioxide-containing gas satisfies a condition that its temperature is from 75° C. to 175° C.

The temperature is from 75° C. to 175° C., preferably from 76° C. to 150° C., more preferably from 77° C. to 120° C., still more preferably from 78° C. to 115° C., still more preferably from 79° C. to 113° C., still more preferably from 80° C. to 110° C., still more preferably from 82° C. to 105° C., particularly preferably from 85° C. to 103° C.

When the target value of the temperature is 100° C. at the time of the performance of the present invention, the temperature may be adjusted to fall within the range of, for example, from 90° C. to 110° C. (in particular, from 95° C. to 105° C.).

When the temperature deviates from the range of from 75° C. to 175° C., the amount of the carbon dioxide gas (i.e. the amount of carbon dioxide) to be fixed reduces.

When the temperature of the carbon dioxide-containing gas (e.g., a plant exhaust gas), which is assumed to be the object treated by the method of the present invention, is less than 75° C. or is more than 175° C., the temperature of the carbon dioxide-containing gas can be adjusted to a desired value in the range of from 75° C. to 175° C. by heating or cooling the carbon dioxide-containing gas.

In the present invention, the time (i.e. contact time or processing time) for which the carbon dioxide-containing gas having the above-mentioned temperature is brought into contact with the above-mentioned powdery or grainy particles is preferably 5 minutes or more, more preferably 10 minutes or more, still more preferably 20 minutes or more, still more preferably 30 minutes or more, particularly preferably 40 minutes or more from the viewpoint of increasing the amount of the carbon dioxide to be fixed.

The upper limit value of the time is preferably 4 hours, more preferably 3 hours, particularly preferably 2 hours from the viewpoint that when the time is excessively long, the efficiency of the fixation treatment reduces and the amount of the carbon dioxide to be fixed hits the ceiling.

Preferred examples of the carbon dioxide-containing gas to be used in the present invention include a gas containing water vapor, a carbon dioxide gas (i.e. carbon dioxide), and an inert gas.

Herein, examples of the inert gas include a nitrogen gas and an argon gas.

With regard to the inert gas described as an example, the ratio of the inert gas in the carbon dioxide-containing gas is preferably 10% or more, more preferably 20% or more, still more preferably 30% or more, particularly preferably 35% or more as a volume fraction value. One of the reasons of the ratio being preferably 10% or more is that such carbon dioxide-containing gas is easily available.

Examples of other component (i.e. component except water vapor, carbon dioxide gas, and inert gas) of the carbon dioxide-containing gas to be used in the present invention include carbon monoxide, hydrocarbons, nitrogen oxides, and sulfur oxides. Those examples of the other component are typically present in a plant exhaust gas or the like.

The ratio of the other components (i.e. gases except carbon dioxide-containing gas) in the carbon dioxide-containing gas is preferably 30% or less, more preferably 20% or less, still more preferably 10% or less, particularly preferably 5% or less as a volume fraction value. One of the reasons of the ratio being preferably 30% or less is that such carbon dioxide-containing gas is easily available.

In the present invention, the relative humidity of the carbon dioxide-containing gas is adjusted in accordance with the particle size of each of the powdery or grainy particles that are the object of contact with the carbon dioxide-containing gas, and the state of adjustment of moisture content of the powdery or grainy particles before the contact with the carbon dioxide-containing gas (i.e. before the contact step).

In more detail, firstly, a reference value is set in the range of from 0.8 mm to 1.5 mm. Then, the relative humidity of the carbon dioxide-containing gas is adjusted in a way selected from the following (a) to (c) based on the above-mentioned reference value.

(a) When the particle size of each of the powdery or grainy particles is less than the reference value, the relative humidity of the carbon dioxide-containing gas is adjusted to 20% or more irrespective of the moisture content of the powdery or grainy particles before the contact step.

(b) When the particle size of each of the powdery or grainy particles is equal to or more than the reference value, and the powdery or grainy particles before the contact step contain moisture, the relative humidity of the carbon dioxide-containing gas is adjusted to from 0% to 40%.

(c) When the particle size of each of the powdery or grainy particles is equal to or more than the reference value, and the powdery or grainy particles before the contact step are free of moisture (i.e. do not contain water), the relative humidity of the carbon dioxide-containing gas is adjusted to 20% or more.

The terms "less than the reference value" and "equal to or more than the reference value" are described for purpose of dividing a numerical range into two ranges through use of the reference value as a boundary, and hence can be replaced by the terms "equal to or less than the reference value" and "more than the reference value," respectively in the present invention. That is, the above-mentioned (a) to (c) after the replacement by the terms "equal to or less than the reference value" and "more than the reference value" are also encompassed in the present invention.

In the case where the relative humidity of the carbon dioxide-containing gas is adjusted as described in the above-mentioned (a) to (c), a larger value can be obtained as the carbonation ratio of the powdery or grainy particles as compared to that in the case where the relative humidity deviates from the numerical ranges of the relative humidity specified in the above-mentioned (a) to (c).

Although the reference value can be set to an arbitrary value as long as the value falls within the range of from 0.8 mm to 1.5 mm, the value is set preferably in the range of from 0.9 mm to 1.4 mm, more preferably in the range of from 1.0 mm to 1.3 mm from the viewpoint of obtaining a large carbonation ratio more reliably.

In the case of the above-mentioned (a), the relative humidity of the carbon dioxide-containing gas is 20% or more, preferably from 22% to 100%, more preferably from 25% to 80%, still more preferably from 25% to 70%, particularly preferably from 25% to 60% from the viewpoint of obtaining a large carbonation ratio.

In the case of the above-mentioned (b), the relative humidity of the carbon dioxide-containing gas is from 0% to 40%, preferably from 0% to 35% more preferably from 20% to 35% from the viewpoint of obtaining a large carbonation ratio.

In the case of the above-mentioned (b), the method of fixing carbon dioxide of the present invention may include a water absorption step of causing the powdery or grainy particles to absorb water by supplying water to the powdery or grainy particles before the contact step.

For example, in the case where it is difficult to adjust the relative humidity of the carbon dioxide-containing gas to 20% or more (e.g., the case where the temperature of the carbon dioxide-containing gas is from 100° C. to 110° C., and no means for supplying moisture to the carbon dioxide-containing gas is present), it is possible to change the state of the above-mentioned (c) to the state of the above-mentioned (b) by supplying water to the powdery or grainy particles before the contact step, and then conduct (i.e. perform) the contact step while maintaining (i.e. keeping) the relative humidity of the carbon dioxide-containing gas within the range of, for example, from 0% to 10%.

In the case of the above-mentioned (c), the relative humidity of the carbon dioxide-containing gas is 20% or more, preferably 30% or more, more preferably 40% or more, still more preferably 60% or more, still more preferably 80% or more, particularly preferably 100% or more from the viewpoint of obtaining a large carbonation ratio.

In the case of the above-mentioned (c), the method of fixing carbon dioxide of the present invention may include a drying step of drying the powdery or grainy particles until the powdery or grainy particles are brought into an absolute dry state before the contact step.

For example, in the case where the temperature of the carbon dioxide-containing gas is from 75° C. to 100° C., and means for supplying moisture to the carbon dioxide-containing gas is present, the following embodiment may be adopted from the viewpoint of obtaining a large carbonation ratio. Firstly, the powdery or grainy particles containing moisture (i.e. water) are dried until the powdery or grainy particles are brought into an absolute dry state (i.e. a state where the powdery or grainy particles do not contain water). After that, the powdery or grainy particles in an absolute dry state thus obtained are brought into contact with the carbon dioxide-containing gas having a relative humidity of, for example, 90% or more. In this embodiment, a larger carbonation ratio can be obtained as compared to that in the case where the powdery or grainy particles containing moisture are brought into contact with the carbon dioxide-containing gas having a relative humidity of from 0% to 40% in accordance with the above-mentioned (b).

The method of fixing carbon dioxide of the present invention may include, before the contact step, a classification step of classifying the powdery or grainy particles based on a sieving reference value set in the range of from 0.8 mm to 1.5 mm to provide powdery or grainy particles each having a particle size of less than the reference value and powdery or grainy particles each having a particle size equal to or more than the reference value.

The terms "less than the reference value" and "equal to or more than the reference value" are described for dividing a numerical range into two ranges through use of the reference value as a boundary, and hence can be replaced with the terms "equal to or less than the reference value" and "more than the reference value," respectively in the present invention. That is, the contents of the above-mentioned classification step after the replacement with the terms "equal to or less than the reference value" and "more than the reference value" are also encompassed in the present invention.

By conducting the classification step, the powdery or grainy particles are determined to be classified in the above-mentioned (a) (i.e. the case where the particle size of each of the powdery or grainy particles is less than the reference value), or the above-mentioned (b) and (c) (the cases where the particle size of each of the powdery or grainy particles is equal to or more than the reference value).

EXAMPLES

The present invention is described below by way of Examples. However, the present invention is not limited to Examples, and may adopt various embodiments as long as the embodiments are included in the scope of claims.

Experimental Example 1

(1) Production of Specimen Formed of Cementitious Hardened Body
(1-a) Powdery or Grainy Particles Each Having Particle Size Equal to or More than Reference Value ("Grainy" in Column "Form" in Table 1)
100 Parts by mass of high-early-strength Portland cement and 70 parts by mass of water were mixed to provide a cement paste. After that, the cement paste was filled into a form, and was cured in a closed vessel filled with water for 50 days. Thus, a cement paste hardened body (size: 10 mm×10 mm×2 mm) that was a specimen was produced.

In addition to the resultant specimen ("Present" in the column "Moisture" in Table 1; Experimental Example 1), a product obtained by drying the specimen to bring the specimen into an absolute dry state ("Absent" in the column "Moisture" in Table 1; Experimental Example 2) was prepared.

(1-b) Powdery or Grainy Particles Each Having Particle Size of Less than Reference Value ("Powdery" in Column "Form" in Table 1)

A cement paste hardened body (size: 10 mm×10 mm×2 mm) produced in the same manner as in the section (1-a) was pulverized to provide powdery or grainy particles having a maximum particle size of 1 mm or less.

The resultant powdery or grainy particles (maximum particle size: 1 mm or less) were divided into two groups, and one of the groups was further cured in a closed vessel filled with water for 90 days to provide a specimen ("Present" in the column "Moisture" in Table 1; Experimental Example 3), while the other group was dried to be brought into an absolute dry state, thereby providing a specimen ("Absent" in the column "Moisture" in Table 1; Experimental Example 4).

(2) Preparation of Carbon Dioxide-Containing Gas

Gases (number of kind: five) in each of which a water vapor ratio was any one of five values set in the range of from 0% to 109% (relative humidity) as shown in Table 1, the ratio of carbon dioxide gas was 25%, and the other component was nitrogen gas were used as carbon dioxide-containing gases. In Table 1, the column "Humidity" represents a relative humidity.

(3) Contact Between Powdery or Grainy Particles and Carbon Dioxide-Containing Gas Each of the produced specimens (powdery or grainy particles each formed of the cement paste hardened body) was mounted on an alumina boat in a tubular electric furnace (product number: KTF433, manufacturer: Koyo Thermo Systems Co., Ltd.). Next, each of the carbon dioxide-containing gases was supplied into the tubular electric furnace, and the specimen was subjected to heating treatment by being brought into contact with the carbon dioxide-containing gas at a temperature of 100° C. (i.e. in an atmosphere having a temperature of 100° C.) for 60 minutes.

(4) Calculation of Carbonation Ratio

The ratio of the calcium carbonate in each of the specimens (i.e. powdery or grainy particles each formed of the cement paste hardened body) after the heating treatment in the section (3) was determined from a mass reduction in the range of from 480° C. to 800° C. with a thermogravimetric differential thermal analyzer (TG-DTA). Herein, the ratio of the calcium carbonate means the ratio of the mass of calcium carbonate to the mass of the specimens after the measurement with the TG-DTA where the specimens is heated to 1,000° C.

In other words, the ratio (unit:mass %) of the calcium carbonate means the ratio of the mass of the calcium carbonate to the mass of the specimen after the measurement of the mass reduction with the TG-DTA in which the measurement is performed while the specimen is heated until its temperature reaches 1,000° C. (expressed as a formula of [mass of calcium carbonate]×100/[mass of specimen]; unit: %).

The mass reduction in the range of from 480° C. to 800° C. measured with the TG-DTA means that the calcium carbonate in the specimen (i.e. cement paste hardened body) underwent decarbonation (in other words, the $CaCO_3$ changed into CaO). That is, the amount of the calcium carbonate ($CaCO_3$) before the decarbonation can be calculated on the basis of the degree of the mass reduction (i.e. $CO_2$ amount).

Meanwhile, when main minerals (alite, belite, $C_3A$, and $C_4AF$) in unhydrated cement are completely carbonated, the ratio of the mass of calcium carbonate to 100 mass % of the unhydrated cement (hereinafter sometimes referred to as "theoretical mass ratio of the calcium carbonate") is theoretically calculated to be 113 mass %.

Herein, the theoretical mass ratio of the calcium carbonate is represented by the following equation.

Theoretical mass ratio (%) of calcium carbonate="mass of calcium carbonate in case where main minerals (i.e. alite, belite, $C_3A$, and $C_4AF$) in unhydrated cement are completely carbonated"×100/"mass of unhydrated cement"

Herein, $C_3A$ means an aluminate phase (i.e. $3CaO \cdot Al_2O_3$), and $C_4AF$ means a ferrite phase (i.e. $4CaO \cdot Al_2O_3 \cdot Fe_2O_3$).

Accordingly, the carbonation ratio (%) of the specimen can be calculated from the following equation.

Carbonation ratio (%)=[ratio (%) of mass of calcium carbonate to mass of specimen after measurement of mass reduction with TG-DTA (wherein measurement is performed while specimen is heated until its temperature reaches 1,000° C.)]×100/[theoretical mass ratio of calcium carbonate (113%)]

The carbonation ratio (%) calculated by using the equation is shown in Table 1.

It is found from Table 1 that in the case where the relative humidity of each of the carbon dioxide-containing gases is adjusted as described in the above-mentioned (a) to (c), a larger carbonation ratio is obtained as compared to that in a case that does not correspond to the above-mentioned (a) to (c).

dioxide contained in the carbon dioxide-containing gas to the powdery or grainy particles, wherein the method of fixing carbon dioxide comprises, before the contact step, a classification step of classifying the powdery or grainy particles based on a sieving reference value set in a range of from 0.8 mm to 1.5 mm to provide powdery or grainy particles each having a particle size of less than the reference value and powdery or grainy particles each having a particle size equal to or more than the reference value, wherein in the contact step, a relative humidity of the carbon dioxide-containing gas is adjusted in accordance with the particle size of the powdery or grainy particles and a state of adjustment of moisture content of the powdery or grainy particles before the contact step in accordance with (a) to (c) as follows:

(a) when the particle size of each of the powdery or grainy particles is less than the reference value, the relative humidity of the carbon dioxide-containing gas is adjusted to 20% or more irrespective of the moisture content of the powdery or grainy particles before the contact step;

(b) when the particle size of each of the powdery or grainy particles is equal to or more than the reference value, and the powdery or grainy particles before the contact step contain moisture, the relative humidity of the carbon dioxide-containing gas is adjusted to from 0% to 40%; and (c) when the particle size of each of the powdery or grainy particles is equal to or more than the reference value, and the powdery or grainy particles before the contact step are free of moisture, the relative humidity of the carbon dioxide-containing gas is adjusted to 20% or more, and wherein the method of fixing carbon dioxide comprises, in a case of the (b), a water absorption step of causing the powdery or grainy particles to absorb water by supplying the water to the powdery or grainy particles before the contact step, or comprises, in a case of the (c), a drying step of drying the powdery or grainy particles until the powdery or grainy particles are

TABLE 1

| | Form | Moisture | Carbonation ratio (%) | | | | |
| --- | --- | --- | --- | --- | --- | --- | --- |
| | | | Humidity 0% | Humidity 7% | Humidity 27% | Humidity 53% | Humidity 109% |
| Experimental Example 1 | Grainy | Present | 16 | 16 | 25 | 5 | 3 |
| Experimental Example 2 | Grainy | Absent | 1 | 4 | 16 | 25 | 38 |
| Experimental Example 3 | Powdery | Present | 31 | 27 | 57 | 61 | 44 |
| Experimental Example 4 | Powdery | Absent | 2 | 11 | 56 | 63 | 33 |

The invention claimed is:

1. A method of fixing carbon dioxide, comprising a contact step of bringing a carbon dioxide-containing gas, which contains carbon dioxide gas at a ratio of 5% or more as a volume fraction value, into contact with powdery or grainy particles, which are each formed of a cementitious hardened body and each have a particle size of 40 mm or less, at a temperature of from 75° C. to 110° C. to fix carbon brought into an absolute dry state before the contact step.

2. The method of fixing carbon dioxide according to claim 1, wherein the carbon dioxide-containing gas is a plant exhaust gas.

3. The method of fixing carbon dioxide according to claim 1, wherein the cementitious hardened body is a recycled aggregate, a waste material of a building material formed of concrete or mortar, a waste material of a cement paste hardened body, or sludge produced in using ready-mixed concrete.

* * * * *